United States Patent
Horn

(10) Patent No.: US 7,698,625 B2
(45) Date of Patent: Apr. 13, 2010

(54) SYSTEM FOR IMPROVING PARITY GENERATION AND REBUILD PERFORMANCE

(75) Inventor: Robert L. Horn, Yorba Linda, CA (US)

(73) Assignee: Adaptec, Inc., Milpitas, CA (US)

( * ) Notice: Subject to any disclaimer, the term of this patent is extended or adjusted under 35 U.S.C. 154(b) by 1065 days.

(21) Appl. No.: 10/925,170

(22) Filed: Aug. 25, 2004

(65) Prior Publication Data

US 2005/0050384 A1    Mar. 3, 2005

Related U.S. Application Data

(60) Provisional application No. 60/497,701, filed on Aug. 26, 2003.

(51) Int. Cl.
  *H03M 13/00* (2006.01)
(52) U.S. Cl. .................. 714/801; 714/6; 714/E11.088; 711/114
(58) Field of Classification Search ................. 714/801, 714/6, E11.088; 711/114
See application file for complete search history.

(56) References Cited

U.S. PATENT DOCUMENTS

| | | | |
|---|---|---|---|
| 5,331,646 A | 7/1994 | Krueger et al. | |
| 5,499,253 A | 3/1996 | Lary | |
| 5,841,962 A * | 11/1998 | Nakamura et al. | 714/6 |
| 5,978,943 A * | 11/1999 | Narukawa | 714/725 |
| 5,991,531 A * | 11/1999 | Song et al. | 703/26 |
| 6,000,010 A | 12/1999 | Legg | |
| 6,453,428 B1 | 9/2002 | Stephenson | |
| 6,476,737 B1 * | 11/2002 | Caroselli et al. | 341/59 |
| 6,557,123 B1 | 4/2003 | Wiencko, Jr. et al. | |
| 6,577,678 B2 * | 6/2003 | Scheuermann | 375/222 |
| 6,591,338 B1 | 7/2003 | Horst et al. | |
| 6,826,140 B2 * | 11/2004 | Brommer et al. | 369/94 |
| 7,143,329 B1 * | 11/2006 | Trimberger et al. | 714/746 |
| 2002/0194428 A1 * | 12/2002 | Green | 711/114 |
| 2007/0050663 A1 * | 3/2007 | Tomisawa | 714/4 |

* cited by examiner

*Primary Examiner*—M. Mujtaba K Chaudry
*Assistant Examiner*—Enam Ahmed
(74) *Attorney, Agent, or Firm*—Dickstein Shapiro LLP

(57) ABSTRACT

A dual parity hardware architecture that enables data to be read from each sector only once and performs both the P parity and Q parity from the single data source. The Q parity calculator provides parallel processing capabilities so that multiple parity operations are performed on the same sector simultaneously. The dual parity hardware architecture provides flexibility in restoring data, generating parity, and updating parity for differing data sector sizes.

15 Claims, 3 Drawing Sheets

SYSTEM FOR IMPROVING PARITY GENERATION AND REBUILD PERFORMANCE

This application claims the benefit of U.S. Provisional Application No. 60/497,701, filed on Aug. 26, 2003.

FIELD OF INVENTION

The present invention relates to recovering from dual drive failures by utilizing enhanced dual parity generation hardware in a networked storage system without losing data or slowing system performance.

BACKGROUND OF THE INVENTION

With the accelerating growth of Internet and intranet communication, high-bandwidth applications (such as streaming video), and large information databases, the need for networked storage systems has increased dramatically. System performance, data protection, and cost have been some of the main concerns in designing networked storage systems. In the past, many systems have used fibre channel drives because of their speed and reliability. However, fibre channel drives are also very costly. Integrated drive electronics (IDE) drives are much cheaper in terms of dollars per gigabyte of storage; however, their reliability is inferior to that of fibre channel drives. Furthermore, IDE drives require cumbersome 40-pin cable connections and are not easily replaceable when a drive fails. Serial advanced technology attachment (ATA) drives that use the same receptor as their fibre channel counterparts are now available. These drives, therefore, have the speed required for acceptable system performance and are hot-swappable, meaning that failed drives are easily replaced with new ones. Furthermore, they provide more storage than fibre channel drives at a much lower cost. However, serial ATA drives still do not offer the same reliability as fibre channel drives. Thus, there is an industry push to develop high-capacity storage devices that are low cost and extremely reliable.

To improve data reliability, many computer systems implement a redundant array of independent disk (RAID) system, which is a disk system that includes a collection of multiple disk drives organized into a disk array and managed by a common array controller. The array controller presents the array to the user as one or more virtual disks. Disk arrays are the framework to which RAID functionality is added in functional levels to produce cost-effective, highly available, high-performance disk systems.

In RAID systems, the data is distributed over multiple disk drives to allow parallel operation, thereby enhancing disk access performance and providing fault tolerance against drive failures. Currently, a variety of RAID levels from RAID level 0 through RAID level 6 have been specified in the industry. RAID levels 1 through 5 provide a single drive fault tolerance. That is, these RAID levels allow reconstruction of the original data if any one of the disk drives fails. It is quite possible, however, that more than one serial ATA drive may fail in a RAID system. For example, dual drive failures are becoming more common as RAID systems incorporate an increasing number of less expensive disk drives.

To provide, in part, a dual fault tolerance to such failures, the industry has specified a RAID level 6. The RAID 6 architecture is similar to RAID 5, but RAID 6 can overcome the failure of any two disk drives by using an additional parity block for each row (for a storage loss of 2/N). The first parity block (P) is calculated by performing an exclusive OR (XOR) operation on a set of assigned data chunks. Likewise, the second parity block (Q) is generated by using the XOR function on a set of assigned data chunks. When a pair of disk drives fails, the conventional dual-fault tolerant RAID systems reconstruct the data of the failed drives using the parity sets. The RAID systems are well known in the art and are amply described, for example, in *The RAIDbook, 6th Edition: A Storage System Technology Handbook*, edited by Paul Massiglia (1997), which is incorporated herein by reference.

An examplary dual parity scheme performs an XOR operation on horizontal rows of drive sectors to generate P parity and then performs an XOR operation on diagonal patterns of sectors in order to create Q parity. In general, these systems require a prime number of drives and a prime number of sectors per drive in order to perform. For example, Table 1 (below) shows the sector used for performing the P and Q parity calculations for sector 1 in a 11+2 disk configuration. As illustrated, there are 11 data drives (A, B, C, D, E, F, G, H, I, and J) and 2 parity drives (K and L), each having 11 sectors (0, 1, 2, 3, 4, 5, 6, 7, 8, 9, and 10). The sectors used as data sources for the calculation of the P parity appear in bold, while the sectors used as data sources for the calculation of the Q parity are underlined.

TABLE 1

P and Q parity calculations

| | Data Drives | | | | | | | | | | Parity Drives | |
|---|---|---|---|---|---|---|---|---|---|---|---|---|
| | A | B | C | D | E | F | G | H | I | J | K | L |
| Sector 0 | A0 | | | | | | | | | | | |
| Sector 1 | A1 | B1 | C1 | D1 | E1 | F1 | G1 | H1 | I1 | J1 | P1 | Q1 |
| Sector 2 | | | | | | | | | | J2 | | |
| Sector 3 | | | | | | | | | I3 | | | |
| Sector 4 | | | | | | | | H4 | | | | |
| Sector 5 | | | | | | | G5 | | | | | |
| Sector 6 | | | | | | F6 | | | | | | |
| Sector 7 | | | | | E7 | | | | | | | |
| Sector 8 | | | | D8 | | | | | | | | |
| Sector 9 | | | C9 | | | | | | | | | |
| Sector 10 | | B10 | | | | | | | | | | |

In Table 1, it can be seen that P parity is calculated as an XOR of sectors spanning a horizontal row across each of the data drives. For example, in sector 1, the P parity P1 is calculated as an XOR of sector 1 of each of the data drives, i.e., sectors A1, B1, C1, D1, E1, F1, G1, H1, I1, and J1. Table 1 also shows that the Q parity is calculated as an XOR spanning a diagonal of sectors from each of the data drives. For example, in sector 1, the Q parity Q1 is calculated as an XOR spanning the diagonal of sectors A0, B10, C9, D8, E7, F6, G5, H4, I3, and J2.

An examplary dual parity algorithm is found in U.S. Pat. No. 6,453,428, entitled, "Dual-drive fault tolerant method and system for assigning data chunks to column parity sets." The '428 patent describes a method and system for assigning data chunks to column parity sets in a dual-drive fault tolerant storage disk drive system having N disk drives, where N is a prime number. Each of the N disk drives is organized into N chunks such that the N disk drives are configured as one or more N×N array of chunks. The array has chunks arranged in N rows from row 1 to row N and in N columns from column 1 to column N. Each row includes a plurality of data chunks for storing data, a column parity chunk for storing a column parity set, and a row parity chunk for storing a row parity set. These data chunks are assigned in a predetermined order. The data chunks in each row are assigned to the row parity set. Each column parity set is associated with a set of data chunks in the array, wherein row m is associated with column parity set $Q_m$, where m is an integer that ranges from 1 to N. For row 1 of a selected N×N array, a first data chunk is assigned to a column parity set $Q_i$, wherein i is an integer determined by rounding down (N/2). For each of the remaining data chunks in row 1, each data chunk is assigned to a column parity set $Q_j$, wherein j is an integer one less than the column parity set for the preceding data chunk and wherein j wraps to N when j is equal to 0. For each of the remaining rows 2 to N of the selected array, a first logical data chunk is assigned to a column parity set $Q_k$, wherein k is one greater than the column parity set for the first logical data chunk in a preceding row and wherein k wraps to 1 when k is equal to (N+1). For each of the remaining data chunks in rows 2 to N, each data chunk is assigned to a column parity set $Q_n$, wherein n is an integer one less than a column parity set for the preceding data chunk and wherein n wraps to N when n is equal to 0.

The algorithm described in the '428 patent safeguards against losing data in the event of a dual drive failure. However, performing the algorithm described uses excess processing cycles that may otherwise be utilized for performing system storage tasks. Hence, the '428 patent describes a suitable dual parity algorithm for calculating dual parity and for restoring data from a dual drive failure, yet it fails to provide an optimized hardware system capable of performing the dual parity algorithm without affecting system performance. When one data sector changes, multiple Q parity sectors also have to change. If the data chunk size is equal to one or more sectors, it leads to system inefficiencies for random writes. Since parity calculations operate on an entire sector of data, each sector is read into a buffer. As the calculations continue, it may be necessary to access the buffer several times to reacquire sector data, even if that data had been used previously in the parity generation hardware. There is, therefore, a need for an effective means of calculating parity such that the storage system is fault tolerant against a dual drive failure, provides optimal performance by improving buffer bandwidth, and is further capable of generating parity for differing data sector sizes.

Therefore, it is an object of the present invention to provide optimal hardware that minimizes buffer bandwidth requirements for dual parity calculation.

It is yet another object of the present invention to provide a programmable dual parity generator with minimal design complexity.

SUMMARY OF THE INVENTION

The present invention is directed to a dual parity hardware architecture for a storage system. The parity hardware includes a first parity calculator, a second parity calculator capable of parallel operation, a buffer, and a programmable control logic. The programmable control logic is used to operate the buffer and parity calculators to enable the parity hardware to be used for both parity generation and data rebuild, thereby minimizing design complexity. The buffer is used to store all data and parity terms read from the storage devices of the storage system, thereby enabling the parity calculators to use the buffer as a data source. This minimizes the bandwidth required for transfers between the parity hardware and the storage devices of the storage system, and is particularly useful in improve the performance of random writes in the storage system.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 1:
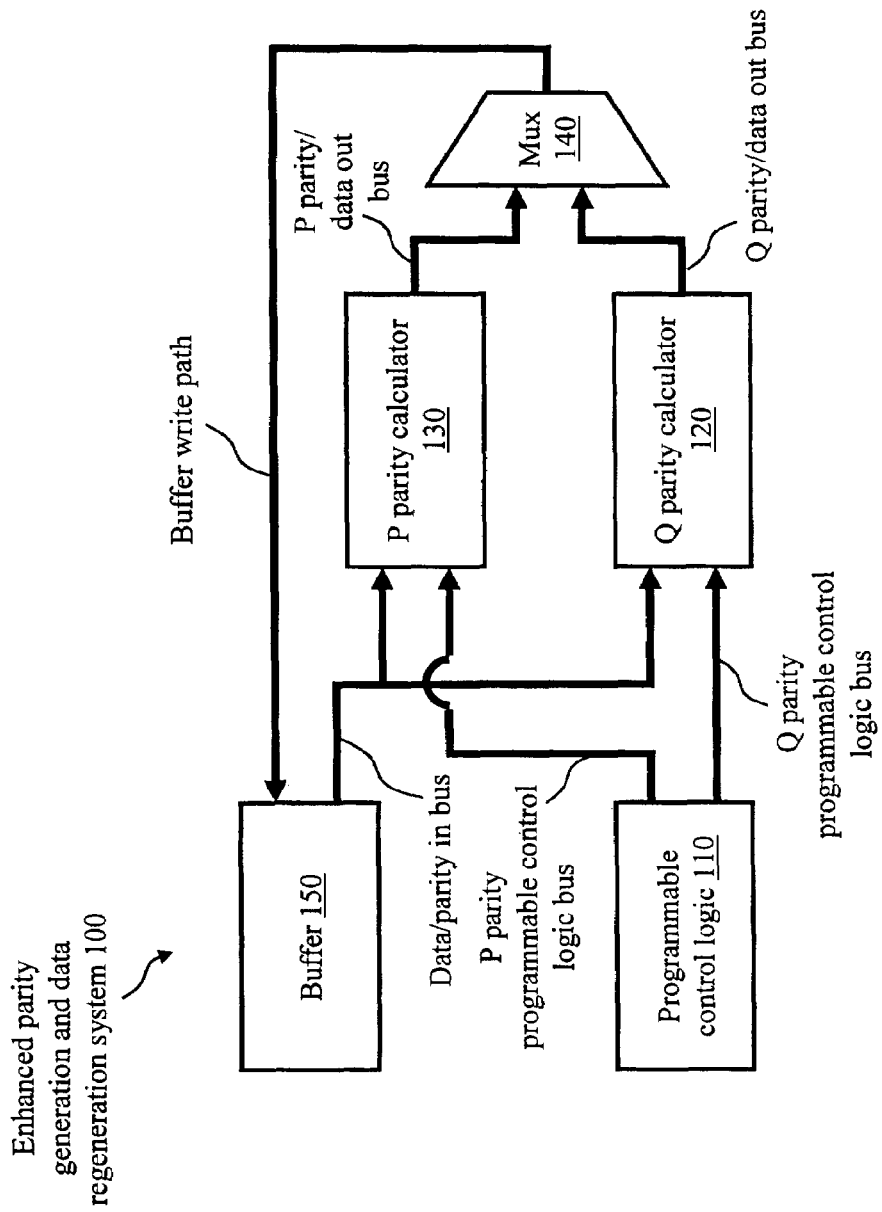
FIG. 1 illustrates the enhanced parity generation and data regeneration system of the present invention.

Now referring to the drawings, where like reference numerals designate like elements, there is shown in FIG. 1 the enhanced parity generation and data regeneration system 100 of the present invention. System 100 is intended for use with a data storage system, which in one exemplary embodiment is a networked disk array system, such as a networked storage system utilizing RAID technology.

Although the disks of the data storage system typically include 512-byte sectors, the present invention may be used with data storage systems with disks using a different sized sector. System 100 supports different sized sectors because, as further described below, the P and Q parities are calculated over sets of symbols, and the system 100 supports symbols of different sizes. Each symbol is a subset of a sector of a disk in the data storage system. For example, a 512-byte sector can be expressed as eight 64-byte symbols. The data storage system 100 preferably also supports the use of 65-byte symbols. Since eight 65-byte symbols totals 520 bytes, it can be seen that by supporting both 64-byte symbols and 65-byte symbols, the system 100 of the present invention is compatible with data storage systems utilizing either 512-byte sectors or 520-byte sectors.

The data storage system may have an even number of data disks, and preferably includes two parity disks. The present invention utilizes phantom drives to ensure that the effective number of data disks for parity calculation is a prime number. Phantom drives are virtual drives which are assumed to have only logical value 0 for every data sector. The present invention only utilizes the XOR function for parity calculation. Thus, the use of phantom drives does not alter the parity calculation because when an XOR is performed on a logical value and the logical value 0, the result of the XOR is the logical value. Accordingly, any number of phantom drives may be added to an even number of data drives to cause the data store system to appear to have a prime number of data drives. For example, in an 8+2 RAID system having 8 data drives and 2 parity drives, 3 phantom drives may be utilized to raise the effective number of data drives to 8+3, or 11. This example is illustrated in Table 2.

TABLE 2

Exemplary XOR calculation ranges for P and Q parity in a sector

| | | Data Drives | | | | | | | | Phantom Drives | | | Parity Drives | |
|---|---|---|---|---|---|---|---|---|---|---|---|---|---|---|
| | | A | B | C | D | E | F | G | H | I | J | K | L | M |
| Sector Symbols | Sector 1, Row 0 | A0 | <u>B0</u> | C0 | D0 | E0 | F0 | G0 | H0 | I0 (0) | J0 (0) | K0 (0) | P0 | Q0 |
| | Sector 1, Row 1 | <u>A1</u> | B1 | C1 | D1 | E1 | F1 | G1 | H1 | I1 (0) | J1 (0) | K1 (0) | P1 | Q1 |
| | Sector 1, Row 2 | A3 | B2 | C2 | D2 | E2 | F2 | G2 | H2 | I2 (0) | J2 (0) | <u>K2</u> (0) | P2 | Q2 |

TABLE 2-continued

Exemplary XOR calculation ranges for P and Q parity in a sector

|  |  | Data Drives | | | | | | | | Phantom Drives | | | Parity Drives | |
|---|---|---|---|---|---|---|---|---|---|---|---|---|---|---|
|  |  | A | B | C | D | E | F | G | H | I | J | K | L | M |
|  | Sector 1, Row 3 | A3 | B3 | C3 | D3 | E3 | F3 | G3 | H3 | I3 (0) | J3 (0) | K3 (0) | P3 | Q3 |
|  | Sector 1, Row 4 | A4 | B4 | C4 | D4 | E4 | F4 | G4 | H4 | I4 (0) | J4 (0) | K4 (0) | P4 | Q4 |
|  | Sector 1, Row 5 | A5 | B5 | C5 | D5 | E5 | F5 | G5 | H5 | I5 (0) | J5 (0) | K5 (0) | P5 | Q5 |
|  | Sector 1, Row 6 | A6 | B6 | C6 | D6 | E6 | F6 | G6 | H6 | I6 (0) | J6 (0) | K6 (0) | P6 | Q6 |
|  | Sector 1, Row 7 | A7 | B7 | C7 | D7 | E7 | F7 | G7 | H7 | I7 (0) | J7 (0) | K7 (0) | P7 | Q7 |
| Phantom Symbols | Sector 1, Row 8 | A8 (0) | B8 (0) | C8 (0) | D8 (0) | E8 (0) | F8 (0) | G8 (0) | H8 (0) | I8 (0) | J8 (0) | K8 (0) | 0 | 0 |
|  | Sector 1, Row 9 | A9 (0) | B9 (0) | C9 (0) | D9 (0) | E9 (0) | F9 (0) | G9 (0) | H9 (0) | I9 (0) | J9 (0) | K9 (0) | 0 | 0 |
|  | Sector 1, Row 10 | A10 (0) | B10 (0) | C10 (0) | D10 (0) | E10 (0) | F10 (0) | G10 (0) | H10 (0) | I10 (0) | J10 (0) | K10 (0) | 0 | 0 |

Table 2 illustrates a sector in a data storage system having 8 data disks (A, B, C, D, E, F, G, and H) and 2 parity disks (L and M). Since 8, the number of data disks in Table 2, is not a prime number, 3 phantom disks (I, J, and K) are included for parity calculation purposes because 8+3=11, a prime number. Similarly, as previously discussed, the sector illustrated in Table 2 is divided into 8 symbols. However, as the number of symbols is also not a prime number, 3 phantom symbols are used so that the effective number of symbols in each sector is also a prime number. As shown in Table 2, each phantom symbol and every symbol corresponding to a phantom drive are set to a logical value of zero.

Table 2 illustrates the symbols used in the calculation of the P and Q parities. More specifically, the P parity P1 for sector 1, row 1 is calculated over a horizontal row of symbols from the data and phantom drives of sector 1, row 1. These symbols (A1, B1, C1, D1, E1, F1, G1, H1, I1, J1, and K1) appear in Table 2 in bold. The Q parity Q1 for sector 1, row 1 is calculated over a diagonal of symbols from the data and phantom drives. These symbols (A1, B0, C10, D9, E8, F7, G6, H5, I4, J3, and K2) are underlined in Table 2.

Referring to FIG. 1, the enhanced parity generation and data regeneration system 100 includes a programmable control logic 110, a Q parity calculator 120, a P parity calculator 130, a multiplexer (mux) 140, and a buffer 150.

Programmable control logic 110 generates the proper control signals, which are then fed to Q parity calculator 120 via a Q parity programmable control logic bus and to P parity calculator 130 via a P parity programmable control logic bus. The control signals sent to Q parity calculator 120 include the terms of the equations that are to be performed on the incoming data (explained in detail in reference to FIG. 2). Programmable control logic 110 alters the terms of the equation depending on the desired task, including parity generation, parity update, data regeneration, etc.

Programmable control logic 110 is capable of orchestrating a rebuild by programming the correct equations for Q parity calculator 120 and P parity calculator 130 into programmable control logic 110 from a code source (not shown), for example, from a RAM or EEPROM. The programmability, therefore, allows different functions to be performed on the same data path (e.g., parity generation or data rebuild). This eliminates the need for specific hardware control logic for data rebuilds and separate hardware control logic for generating parity, as in conventional dual parity networked storage systems.

Buffer 150 provides data sector information or parity sector information to both P parity calculator 130 and Q parity calculator 120 via a data/parity in bus. During parity generation, buffer 150 reads each of the disks' common sectors and provides all of the sector data serially for performing each of the parity calculations. For example, referring to Table 2, buffer 150 reads sector 1 of Disk A sequentially from symbol 0 to symbol 7. Therefore, buffer 150 reads symbol $A_0$, $A_1$, $A_2$, $A_3$, $A_4$, $A_5$, $A_6$, and $A_7$, which constitute one sector. After buffer 150 has read all of the symbols, buffer 150 subsequently sends symbol $A_0$ to P parity calculator 130 and Q parity calculator 120 simultaneously. Buffer 150 then sends symbols $A_1$, $A_2$, $A_3$, etc., in sequence until the entire sector has been sent. Buffer 150 subsequently continues with the next disk sector, Disk B in this example. In this manner, all symbols are read into buffer 150 and subsequently distributed to both P parity calculator 130 and Q parity calculator 120. If parity is generated for multiple sectors per disk, this pattern is repeated for sector 2 (not shown) for disks A through H, followed by sector 3 (not shown), etc.

During a data rebuild, buffer 150 provides the required parity information to P parity calculator 130 and Q parity calculator 120 in order to regenerate the original data. Additionally, programmable control logic 110 is reprogrammed to supply the appropriate rebuild equations.

Mux 140 selects the correct parity or data output from P parity generator 130 (via the P parity data out bus) or the parity or data output from Q parity generator 120 (via the Q parity data out bus). Mux 140 sends the selected data to buffer 150 via a buffer write path. Subsequently, buffer 150 stores parity data on the respective P and Q parity disks (shown in Table 2) or sends the rebuilt data to a new drive or a requesting host during data recovery.

Buffer 150, P parity calculator 130, Q parity calculator 120, and mux 140 further provide enhanced system performance by providing a data path that supports various data sector sizes during both dual parity calculation and data rebuild. For example, they may support an integer multiple of 512-byte or 520-byte data sectors.

Figure 2:
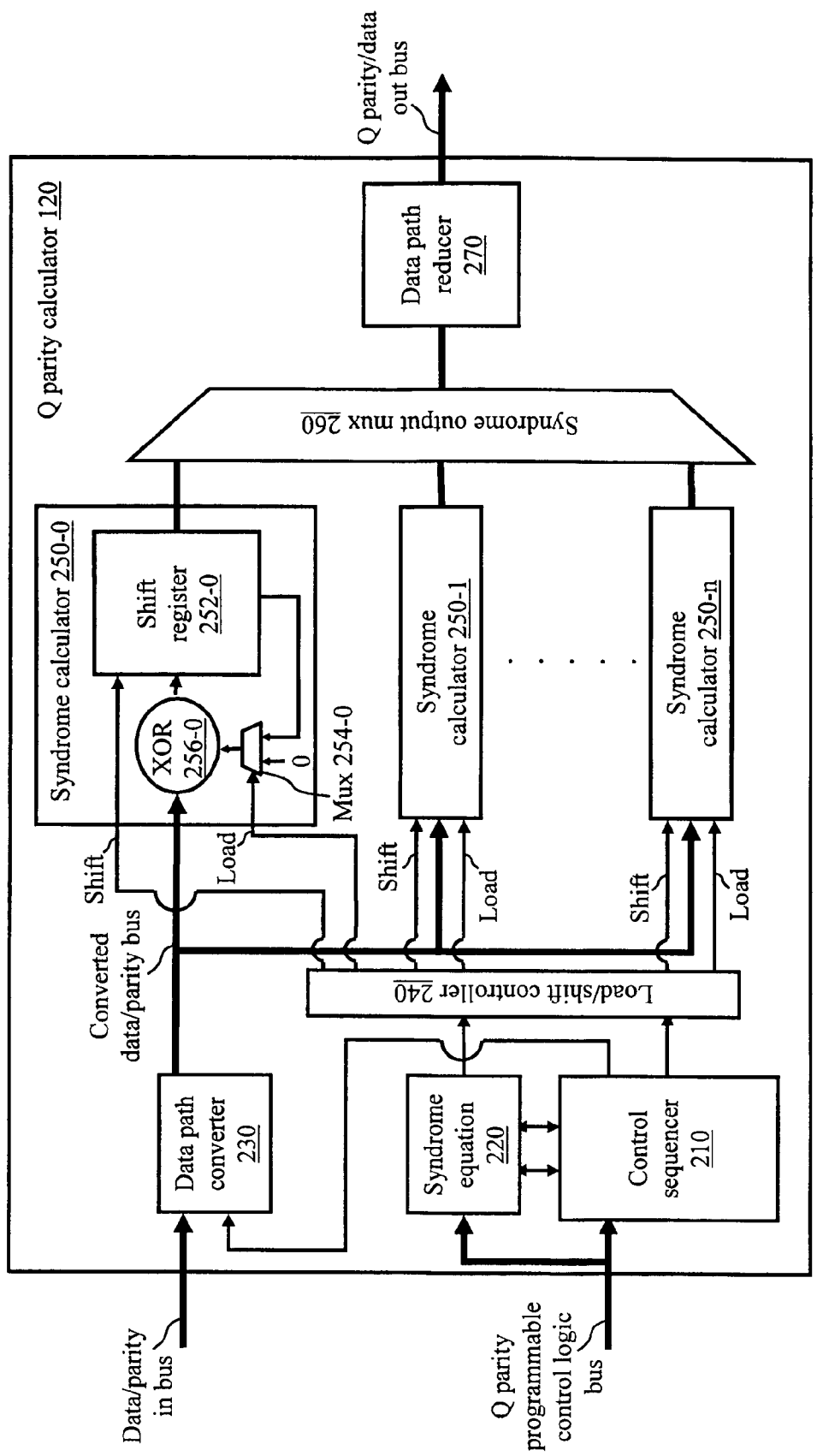
FIG. 2 illustrates the improved Q parity calculator architecture of the present invention.

FIG. 2 illustrates a detailed view of Q parity calculator 120, and further describes the architecture of the present invention that improves dual parity calculation speed and decreases the required bandwidth of buffer 150. Q parity calculator 120 includes a control sequencer 210; a syndrome equation 220; a data path converter 230; a load/shift controller 240; a plurality of syndrome calculators 250-0 through 250-n, where n is any integer value; a syndrome output mux 260; and a data path reducer 270. Syndrome calculator 250-0 further includes a shift register 252-0, a mux 254-0, and an XOR 256-0 function.

Because Q parity calculator 120 calculates multiple Q symbols in parallel, it requires that each data sector be read from buffer 150 only once during the Q parity calculation. In contrast, conventional Q parity systems require data sectors to be read from the buffer more than once for Q parity calculation, which requires additional buffer bandwidth. This parallel processing is utilized in all the various modes of operation (parity generate, parity update, data rebuild, etc).

In operation, Q parity calculator 120 receives data or parity information from buffer 150 on the data/parity in bus into data path converter 230. Data path converter 230 allows the system to support differing data sector sizes, for example, 512- and 520-byte sectors. Programmable control logic 110 sends control signals to control sequencer 210 and syndrome equation 220 on the Q parity programmable control logic bus. The control signals dictate when each of the parallel syndrome calculators 250 should perform the XOR operations. Control sequencer 210 further sends required control signals to data path converter 230 to indicate the required data sector sizes; for example, 520-byte sectors need the 65-byte symbol data to be converted to 65-bit segments for processing. Alternatively, 512-byte sectors require that the symbol data be parsed into 64-bit segments for processing. Because the symbol sizes are 64 or 65 bytes, the symbol data is parsed into eight 64-bit segments or eight 65-bit segments, respectively.

Data path converter 230 sends the converted or segmented data/parity bus data to each of syndrome calculators 250 (64 or 65 bits at a time) such that all syndrome calculators 250 have the same set of data from/parity for one sector. In general, eight clock cycles are required to load a complete symbol of data. Syndrome calculator 252-0 holds the first half of the first symbol in a particular sector, syndrome calculator 252-1 holds the second half of the first symbol in that sector, syndrome calculator 252-2 holds the first half of the second symbol of the same sector, and syndrome calculator 252-3 holds the second half of the second symbol of that sector, and so on. Once all symbols for a sector are loaded into correct syndrome calculator 250, multiple calculations are performed on the data simultaneously and in parallel without having to reread the sector data from buffer 150 multiple times or perform each calculation serially.

Control sequencer 210 and syndrome equation 220 control load/shift controller 240 such that each individual syndrome calculator 250 loads the correct symbol data and performs the correct parity/data calculation on the set of data from buffer 150 at the correct time. Each syndrome calculator 250 is capable of performing XOR operations on 65 bits of data for the incoming data/parity bus data and data stored in shift register 252. Conventional shift register 252 and mux 254 receive the shift signal and the load signals respectively from load/shift controller 240. XOR 256 performs the XOR function on its input data and sends the result to shift register 252. Shift register 252 holds half a symbol of data (e.g., 32 or 32.5 bytes), but shifts out the required number of bits (e.g., 64 or 65 bits) to mux 254 when it receives a shift signal. When the symbol calculations from an individual syndrome calculator 250 are complete (i.e., 32 or 32.5 bytes of data have been processed), shift register 252 shifts out the new parity or rebuilt data symbol to syndrome output mux 260. Subsequently, syndrome output mux 260 sends the required data to data path reducer 270. Data path reducer 270 reduces the data set, for example, from 65 bits to 64 bits, in order to meet the required data sector needs. Data path reducer 270 sends the converted data to mux 140, and mux 140 further sends the selected Q data/parity output to buffer 150. For example, mux 140 sends symbols $P_0$-$P_7$ in sequential order and subsequently sends symbols $Q_0$-$Q_7$ in sequential order. In this manner, all required parity information is generated and/or data is rebuilt from existing parity information after the loss of one or two drives without the loss of data, excessive complex hardware, process cycle-consuming algorithms, or taxing buffer bandwidth.

Figure 3:
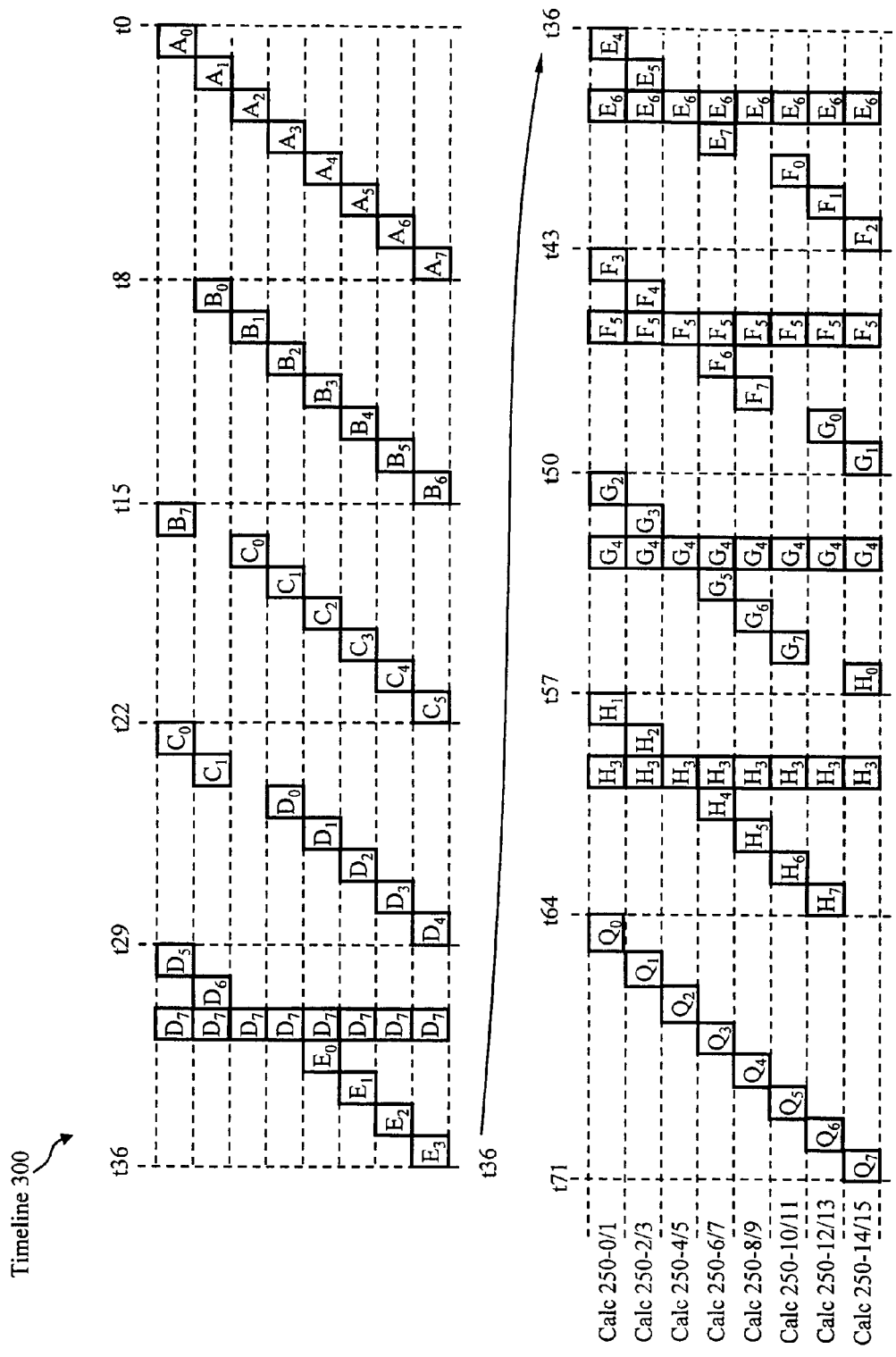
FIG. 3 illustrates the parallel processing capability of the present invention in the form of a timeline.

FIG. 3 illustrates the parallel processing capability of the present invention. Timeline 300 shows the order in which the symbols are subsequently distributed to each syndrome calculator 250. For the purposes of simplification, each syndrome calculator 250 that processes the first half of a symbol has been grouped with the corresponding syndrome calculator 250 that processes the second half of the symbol. Thus, calc 250-0/1 represents the combination of syndrome calculator 250-0 and syndrome calculator 250-1, calc 250-2/3 represents the combination of syndrome calculator 250-2 and syndrome calculator 250-3, etc.

At time $t_0$, syndrome calculators 250 receive symbol $A_0$. At the same time, calc 250-0/1 receives a shift signal from load/shift controller 240, thus storing the first half of symbol $A_0$ in shift register 252-0 and 252-1 (the entire symbol $A_0$ is loaded in eight clock cycles, four for shift register 252-0 and four for shift register 252-1). At time $t_1$, syndrome calculators 250 receive symbol $A_1$. At that time, calc 250-2/3 receives a shift signal from load/shift controller 240, thus storing the first half of symbol $A_1$ in shift register 252-2 and the second half of symbol $A_1$ in shift register 252-3. The process continues until syndrome calculators 250 receive symbol $B_0$ at $t_s$. At this time, load/shift controller 240 sends a load signal to syndrome calculator. 250-2. Mux 254-2 loads the first 64 bits of symbol $A_1$ and performs an XOR operation on the incoming 64 bits of symbol $B_0$; the result is stored in shift register 252-2. Load/shift controller 240 sends a shift signal and a load signal to shift register 252-2, causing the next 64 bits of symbol $A_1$ to be loaded into mux 254-2. At the same time, XOR 256-2 performs an XOR operation on the second 64 bits of symbols $A_1$ and $B_0$. The result is stored in shift register 252-2. In this manner, all symbols are processed until calc 250-12/13 completes processing symbol $H_7$ at time $t_{64}$.

In addition, as is known to those skilled in the art, the dual parity algorithm requires that the XOR operation be performed on the main diagonal, which in this example includes symbols $D_7$, $E_6$, $F_5$, $G_4$, and $H_3$, and each of the other diagonals in order to generate the required Q parity symbol. In other words, Q parity calculator 130 performs the XOR function on each symbol in a diagonal and then performs another XOR operation using that result and the result of the XOR operation performed on the main diagonal. The exception is the main diagonal, which does not require another XOR operation with itself.

Load/shift controller 240 sends continual shift signals to shift register 252-0 until the first half of $Q_0$ has been shifted out to syndrome output mux 260 (eight clock cycles). Subsequently, syndrome output mux 260 sends the 64-bit results to data path reducer 270, which further outputs to Q parity output bus. Ultimately, the information is stored on the Q parity drive. Subsequently, load/shift controller 240 sends continual shift signals to shift register 252-1 until the second half of $Q_0$ parity has been shifted out to syndrome output mux 260. Syndrome output mux 260 further sends the results to data path reducer 270, which are ultimately written on the Q parity drive. Similarly; all other Q parity symbols are shifted, converted (if required), and stored.

In this manner, each syndrome calculator 250 calculates its portion of Q parity by performing XOR operations when the shift and load signals from load/shift controller 240 are received, which is based on equation terms provided by programmable control logic 110. Similarly, data is restored in the same manner; however, programmable control logic 110 is reprogrammed to provide control signals for data rebuild operations rather than parity generation calculations.

Further advantages of the present invention include the ability to easily generate new parity during random writes, when only one sector has new data. Programmable control logic 110 loads parity update equations to perform the parity update and sends the new control signals to syndrome equation 220 and control sequencer 210 for processing. During parity update, it is not necessary to read each of the corresponding disk sectors, only the sector that is changing, the P parity sector, and the Q parity sector. The new equations are performed by P parity calculator 130 and Q parity calculator 120 as described above. For example, referring to Table 2, new data is written to sector 1 of Disk A. The new parity is calculated using the old P parity $P_0$-$P_7$, the old data sector symbols $A_0$-$A_7$, and the new data sector, which has already been stored in buffer 150 due to the host write command. Performing an XOR operation on the old $A_0$ and the new $A_0$ gives a new value. An XOR operation is performed on this new value and the old $P_0$ value to give the new $P_0$ value, and so on through the symbols. No subsequent reading of additional sectors in the row is required. Similarly, a new Q parity is calculated by performing XOR operations on the old $A_0$-$A_7$ values and the new, and then performing XOR operations on the resulting values and the old $Q_0$-$Q_7$ values to calculate the new $Q_0$-$Q_7$ parity. Thus, buffer 150 sends the old parity information along with the old and new sector symbols for processing, avoiding multiple buffer accesses for entire sectors of data in order to generate the new parity, as is necessary in conventional systems.

Although the example used in this description of the invention has used 64/65 byte symbols with sixteen parallel syndrome calculators for an 8+2 P+Q parity RAID configuration, the same invention also supports a 16+2 P+Q parity RAID configuration. In the 16+2 P+Q parity RAID configuration, each syndrome calculator holds 32 or 32.5 bytes, the symbol sizes are reduced to 32 or 32.5-bytes each, and there are sixteen symbols per sector. Thus, by using the appropriate equations, the implemented logic supports both 8+2 and 16+2 configurations.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A parity circuit, comprising:
    a buffer for storing information as a set of symbols, said information comprising a plurality of data, a plurality of first parities, and a plurality of second parities;
    a first calculator, coupled to said buffer, for receiving said set of symbols from said buffer and for supplying a first calculated result to said buffer;
    a second calculator, coupled to said buffer, for receiving said set of symbols from said buffer and for supplying a second calculated result to said buffer;
    a programmable logic circuit, coupled to said first and second calculators, for controlling said first and second calculators, said programmable logic circuit providing logic to said first and second calculators to allow the calculation of parity generation, parity update, and data regeneration for a RAID storage system with a plurality of data disks and parity disks;
    wherein at least one of said first and second calculators comprise:
    a first data transfer circuit, for receiving symbols from said buffer;
    a plurality of calculation circuits, the plurality of calculation circuits being equal in number to the plurality of data disks in the RAID storage system, each one of calculation circuits receiving symbols from said first data transfer circuit;
    a second data transfer circuit for receiving symbols from said plurality of calculation circuits and sending symbols to said buffer; and
    a control sequencer coupled to receive control signals from said programmable logic circuit and for controlling said first data transfer circuit, said plurality of calculation circuits, and said second data transfer circuit.

2. The parity circuit of claim 1, wherein in said at least one of said first and second calculators, said control sequencer operates said plurality of calculation circuits to calculate each one of said plurality of second parities in parallel.

3. The parity circuit of claim 1, wherein each calculation circuit comprises:
    an exclusive OR (XOR) circuit; and
    a shift register coupled to said XOR circuit.

4. The parity circuit of claim 3, wherein said shift register is configurable to store 32 or 32.5 bytes of information.

5. The parity circuit of claim 4, wherein said shift register is configured to store 32 bytes of information when each symbol has a size of 32 bytes.

6. The parity circuit of claim 4, wherein said shift register is configured to store 32.5 bytes of information when each symbol has a size of 32.5 bytes.

7. The parity circuit of claim 4, wherein each symbol is 64 bytes in size, a shift register in one of said calculation circuits stores a first 32 bytes of information from a first portion of a symbol, and a shift register in another one of said calculation circuits stores a second 32 bytes of information from a second portion of said symbol.

8. The parity circuit of claim 4, wherein each symbol is 65 bytes in size,
    a shift register in one of said calculation circuits stores a first 32.5 bytes of information from a first portion of a symbol, and
    a shift register in another one of said calculation circuits stores a second 32.5 bytes of information from a second portion of said symbol.

9. The parity circuit of claim 1, wherein said first data transfer circuit converts from a 64-bit data path to a 65-bit data path.

10. The parity circuit of claim 1, wherein said programmable logic circuit is configurable to operate said parity circuit to update a symbol storing parity, or to operate said parity circuit to regenerate a symbol storing data when said symbol storing data is lost as a result of a storage device failure.

11. The parity circuit of claim 10, wherein said programmable logic circuit is configured by loading a set of syndrome equations.

12. The parity circuit of claim 11, further comprising:
a storage for storing:
  a first set of syndrome equations, which if loaded by said programmable logic circuit causes said parity circuit to update existing ones of said set of symbols, and
  a second set of syndrome equations, which if loaded by said programmable logic circuit causes said parity circuit to regenerate symbols to replace symbols lost as a result of a storage device failure.

13. A method for operating a parity circuit in a storage system storing as a set of symbols, information comprising data, a plurality of first parities, and a plurality of second parities, the method comprising:
  reading, from said storage system, a set of symbols from a same selected sector from each of multiple storage devices of said storage system;
  distributing said set of symbols to a first calculator and a second calculator; and
  in said first and second calculators, respectively producing a first result and a second result based on said set of symbols, wherein said first result and second result include symbols with updated parity or, in the event of a failure of a storage device, symbols with rebuilt data, said production of first and second results being facilitated by a programmable logic circuit that allows for parity generation, parity update, and data regeneration.
  wherein at least one of said first and second calculators comprises a plurality of calculation circuits, the plurality of calculation circuits being equal in number to the plurality of storage devices of said storage system.

14. A method for recalculating a parity in a storage system which stores information as a set of symbols, said information comprising data and a plurality of parities, the method comprising:
  reading, from said storage system, a set of symbols from a same selected sector of
  each of multiple storage devices of said storage system;
  distributing said set of symbols to a plurality of calculation circuits; and
  computing, at each of said plurality of calculation circuits, a respective different one of said plurality of parities using said set of symbols, said computing being facilitated by a programmable logic circuit that allows for parity generation, parity update, and data regeneration,
  wherein the plurality of calculation circuits are organized in first and second calculators, and wherein at least one of said first and second calculators comprises a number of said plurality of calculation circuits that is equal in number to the plurality of storage devices of said storage system.

15. A method for recalculating missing information in a storage system, said information comprising a data and a plurality of parities, the method comprising:
  reading, from said storage system, a set of symbols from a selected sector of each multiple storage devices of said storage system;
  distributing said set of symbols to a plurality of calculation circuits; and
  computing, at each of said plurality of calculation circuits, a set of results based on said set of symbols, said set of results including symbols with updated parity or, in the event of a data storage device failure, symbols with rebuilt data, said computing being facilitated by a programmable logic circuit that allows for parity generation, parity update, and the data regeneration,
  wherein the plurality of calculation circuits are organized in first and second calculators, and wherein at least one of said first and second calculators comprises a number of said plurality of calculation circuits that is equal in number to the plurality of storage devices of said storage system.

* * * * *